United States Patent
Seki et al.

(10) Patent No.: US 7,133,682 B2
(45) Date of Patent: Nov. 7, 2006

(54) MOBILE COMMUNICATION SYSTEM AND COMMUNICATION METHOD FOR MOBILE COMMUNICATION SYSTEM

(75) Inventors: Hiroyuki Seki, Kawasaki (JP); Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 343 days.

(21) Appl. No.: 10/826,962

(22) Filed: Apr. 16, 2004

(65) Prior Publication Data

US 2004/0248581 A1 Dec. 9, 2004

Related U.S. Application Data

(63) Continuation of application No. PCT/JP01/09173, filed on Oct. 18, 2001.

(51) Int. Cl.
*H04B 7/00* (2006.01)

(52) U.S. Cl. .................. 455/450; 455/522; 455/67.13

(58) Field of Classification Search ............. 455/450, 455/522, 69, 67.1, 422, 452.2, 509, 560, 455/437, 439, 436; 370/335
See application file for complete search history.

(56) References Cited

U.S. PATENT DOCUMENTS

| 6,070,084 | A | 5/2000 | Hamabe | |
| 6,385,183 | B1 * | 5/2002 | Takeo | 370/335 |
| 6,603,971 | B1 * | 8/2003 | Mohebbi | 455/437 |
| 2002/0058510 | A1 * | 5/2002 | Mohebbi | 455/437 |
| 2005/0130688 | A1 * | 6/2005 | Hashem et al. | 455/522 |

FOREIGN PATENT DOCUMENTS

| EP | 0 797 367 A2 | 9/1997 |
| EP | 0 989 690 A2 | 3/2000 |
| EP | 1 039 658 A2 | 9/2000 |
| JP | 9-312609 | 12/1997 |
| JP | 2000-059297 | 2/2000 |
| JP | 2001-057528 | 2/2001 |
| WO | WO 97/08911 | 3/1997 |
| WO | WO 99/59366 | 11/1999 |
| WO | WO 99/59367 | 11/1999 |
| WO | WO 00/48336 | 8/2000 |

OTHER PUBLICATIONS

Akihito Morimoto et al. Independent Fast Transmit Power Control for Each Cell Site in W-CDMA Forward Link Inter-cell Site Diversity. Technical Report of IEICE. pp. 1-7.

* cited by examiner

*Primary Examiner*—Matthew D. Anderson
*Assistant Examiner*—Tan Trinh
(74) *Attorney, Agent, or Firm*—Katten Muchin Rosenman LLP (57) ABSTRACT

A mobile communication system performing communication between a plurality of base stations and a mobile station is provided. A user data signal is transmitted with the transmission power controlled from one base station selected among the plurality of base stations. Control data signals are transmitted from the plurality of base stations to the mobile station, with the transmission power controlled in a similar way as the user data signal. The mobile station measures quality of the control data signals on a basis of each base station, and selects a base station based on the measured control data signal quality of each base station.

11 Claims, 6 Drawing Sheets

| BASE STATION | TPC BIT | DPDCH POWER CONTROL | DPCCH POWER CONTROL |
|---|---|---|---|
| PRIMARYCELL | 1 | +1dB | +1dB |
| | 0 | −1dB | −1dB |
| NON-PRIMARYCELL | 1 | OFF | +1dB |
| | 0 | OFF | 0dB |

FIG. 4B

| BASE STATION | TPC BIT | DPDCH POWER CONTROL | DPCCH POWER CONTROL |
|---|---|---|---|
| PRIMARYCELL | 1 | +1dB | +1dB |
| | 0 | −1dB | −1dB |
| NON-PRIMARYCELL | 1 | OFF | +0.5dB |
| | 0 | OFF | −0.5dB |

FIG. 4C

| BASE STATION | TPC BIT | DPDCH POWER CONTROL | DPCCH POWER CONTROL |
|---|---|---|---|
| PRIMARYCELL | 1 | +1dB | +1dB |
| | 0 | −1dB | −1dB |
| NON-PRIMARYCELL | 1 | OFF | 0dB |
| | 0 | OFF | 0dB |

| BASE STATION | TPC BIT | DPDCH POWER CONTROL | DPCCH POWER CONTROL |
|---|---|---|---|
| PRIMARYCELL | 1 | +1dB | +1dB |
| | 0 | −1dB | −1dB |
| NON-PRIMARYCELL | 1 | OFF | +1dB |
| | 0 | OFF | −1dB |

MOBILE COMMUNICATION SYSTEM AND COMMUNICATION METHOD FOR MOBILE COMMUNICATION SYSTEM

CROSS-REFERENCE TO RELATED APPLICATIONS

The present application is a continuation of International PCT Application No. PCT/JP01/09173 filed on Oct. 18, 2001, pending.

FIELD OF THE INVENTION

The present invention relates to a mobile station and a base station performing wireless communication, and a mobile communication system including a mobile station and a base station, and a communication method for a mobile communication system.

BACKGROUND ARTS

As one of a communication system for the third generation wireless communications (standardized by IUT-T as International Mobile Telecommunications-2000, or IMT-2000), the W-CDMA (Wideband Code Division Multiple Access) system has been adopted. In this W-CDMA, various techniques are introduced to improve communicating quality (wireless transmission quality), which include soft handover (site diversity), site selection diversity transmit power control (SSDT), and closed-loop transmission power control.

The soft handover is a technique in which a mobile station is simultaneously connected with a plurality of base stations through wireless links, and receives signals from the plurality of base stations using the RAKE receivers. At the time of the soft handover, the entire plurality of base stations performing the soft handover transmit signals on Dedicated Physical Channels (DPCH), and the mobile station receives the DPCH signals from the plurality of base stations.

The SSDT is a method for power control performed at the time of the soft handover, to solve a problem of increased interference on a downlink (i.e. a link directed to a mobile station from a base station) produced by the identical DPCH signals being transmitted to the mobile station from the plurality of base stations at the time of the soft hardover. The mobile station selects one of the base stations performing the soft handover as a primary cell, whereas other base stations are determined as non-primary cells. Only the primary cell transmits signals on a Dedicated Physical Data Channel (DPDCH) in the DPCH, and non-primary cells do not transmit any DPDCH signals. Among the DPCH signals, Dedicated Physical Control Channel (DPCCH) signals are transmitted for the entire base stations performing the soft handover.

In the SSDT method, a mobile station measures the received signal code power (RSCP) of a Common Pilot Channel (CPICH) transmitted with constant power from each base station. The mobile station selects base stations of which measurement result is higher than the predetermined threshold as soft handover candidate. Among these soft handover candidates, the mobile station selects the base station producing the maximum RSCP as primary cell. By mobile station can receive the DPDCH with better reception quality.

The closed-loop transmission power control is a power control method performed in the following way: Both a mobile station and a base station measure reception signal quality (i.e. transmission signal quality in terms of the transmission side). Depending on the measurement result, a transmit power control (TPC) command is transmitted to a transmission side so that a reception side can receive a signal with desired quality. The transmission side then controls the own transmission power based on the TPC command. This control method aims to solve the far-to-near problem and reduce an effect caused by fading fluctuation. As a measurement criterion for the receive signal quality, the SIR (signal-to-interference power ratio) is applied.

Here, in the conventional SSDT, particularly in an inner-loop control of the transmission power control on the downlink, a mobile station measures the SIR of the DPCCH received from a primary cell, compares the measurement value with a target SIR value, and generates a TPC command in accordance with the comparison result. The mobile station then transmits this TPC command to both the primary cell and the non-primary cells through the uplinks (links directed to the base stations from the mobile station). According to the TPC command, the primary cell controls transmission power of the DDPCH and the DPCCH on the downlink. Meanwhile, the non-primary cells control the transmission power of the DPCCH on the downlink, but do not control the transmission power on the DPDCH.

Figure 6:
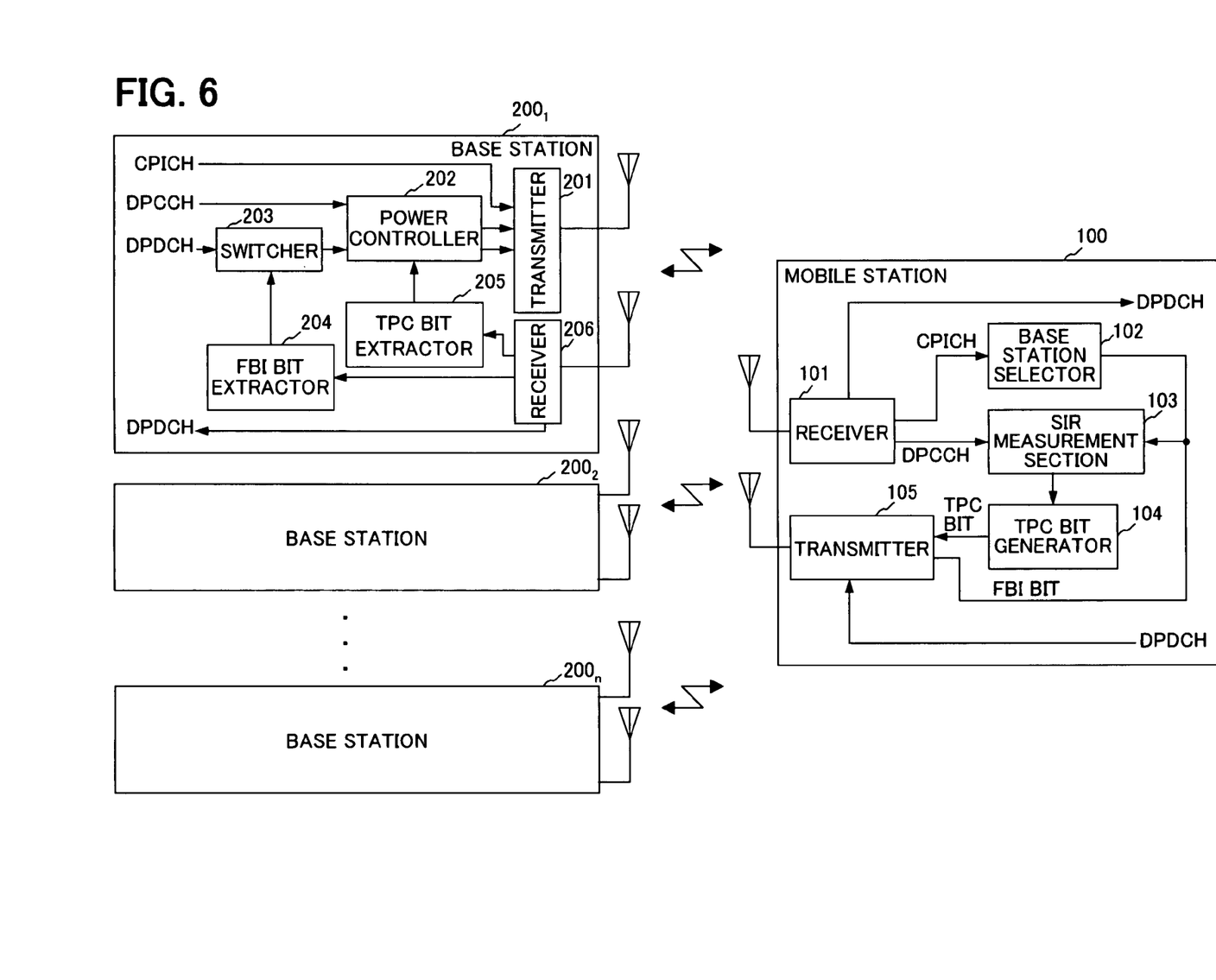
FIG. 6 shows an aspect of transmission power control for the downlink in case of the conventional SSDT.

FIG. 6 shows a state of transmission power control on the downlink at the time of the SSDT. A base station selector 102 provided in a mobile station 100 measures the RSCP of the CPICH transmitted from n base stations $200_1$–$200_n$ (where n is integer no less than 2), and selects the base station producing the maximum RSCP value as primary cell. The selection result of the primary cell is transmitted to base station $200_1$–$200_n$ on uplink feedback information (FBI), in which identification information of the base station indicating the primary cell is included. Thus, each base station $200_1$–$200_n$ can identify whether the base station of interest is the primary cell or the non-primary cell.

An SIR measurement section 103 provided in mobile station 100 measures the SIR of the DPCCH transmitted from the base station which has been selected as primary cell by base station selector 102, among the DPCCH transmitted from base stations $200_1$–$200_n$. SIR measurement section 103 then feeds the measurement result to a TPC bit generator 104. The bit generator 104 compares the measured SIR with a target SIR having been set in advance, and generates a TPC command based on the comparison result. The generated TPC command is transmitted to base stations $200_1$–$200_n$.

In base stations $200_1$–$200_n$, an FBI bit extractor 204 extracts, from the received data, identification information of the base station having been selected as primary cell. Based on this base station identification information, a switcher (SW) 203 determines whether or not the base station of interest is selected as primary cell. If the base station of interest has been selected as primary cell, the base station concerned outputs a DPDCH data to a power controller 202, whereas if the base station concerned is not selected as primary cell, the base station concerned does not output any DPDCH data to power controller 202.

Meanwhile, a TPC bit extractor 205 extracts the TPC command from the received data, and then feeds the TPC command to power controller 202. Power controller 202 controls the transmission power of the DPCCH according to the TPC command. Power controller 202 further controls the transmission power of the DPDC in case of the DPDCH data is supplied from switcher (SW) 203 according to the TPC command. These power-controlled channel data are transmitted to mobile station 100.

Figure 7:
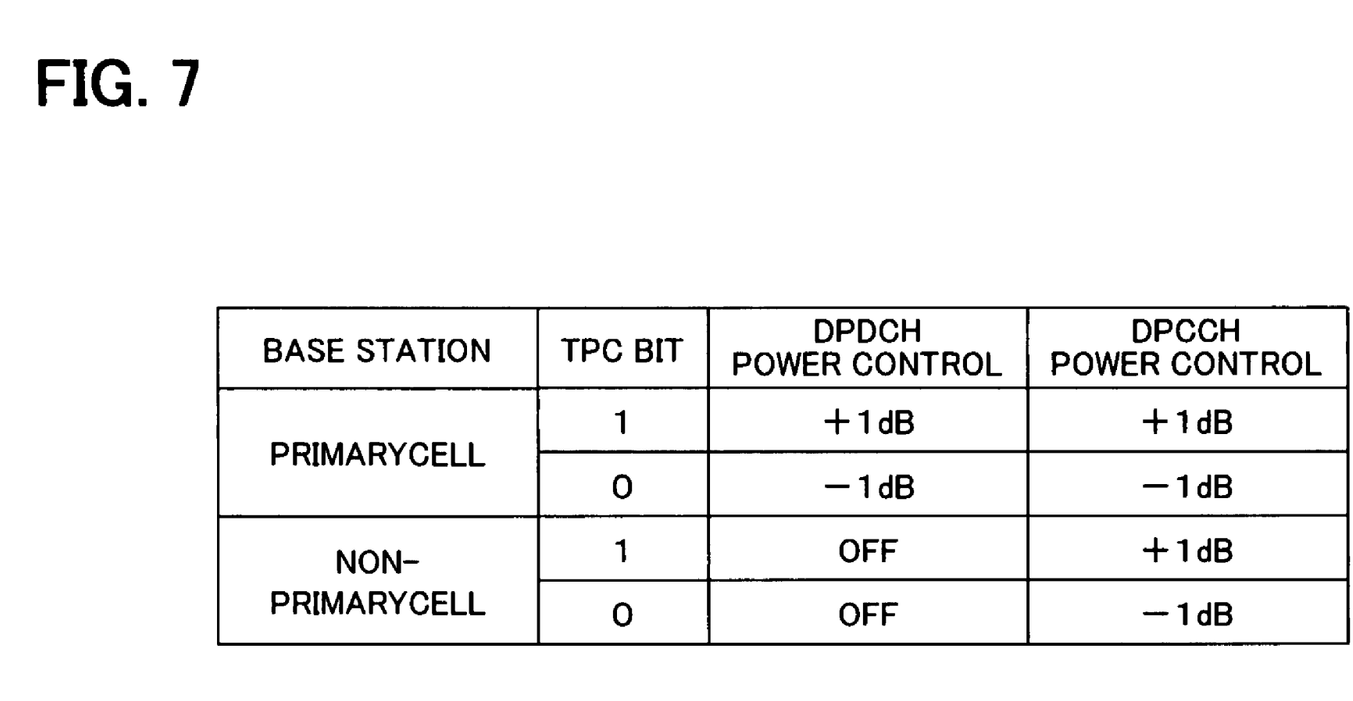
FIG. 7 shows the conventional power control method illustrated in a tabular form.

The power control by power controller 202 is performed using the same control method, irrespectively of whether the base station concerned is the primary cell or the non-primary cell, according to the same TPC command (that is, the same increase/decrease amount of power based on the same increment/decrement). FIG. 7 shows such a conventional power control method in a tabular form. Both the primary cell and the non-primary cell increase the transmission power by 1 dB when the TPC command indicates '1', or decreases the transmission power by 1 dB when the TPC command indicates '0'.

As such, in the conventional SSDT method, the primary cell selection is performed independently of the transmission power control. Namely, the primary cell selection is determined being referenced from the RSCP of the CPICH, whereas the transmission power control is performed by use of the TPC command determined by referencing the SIR of the DPCCH. Moreover, the TPC command is transmitted on each time slot bases, and therefore the transmission power control is updated at each time interval T of the time slot (for example, T=0.667 ms). In contrast, the primary cell selection information is transmitted using no less than three time slots, and therefore the primary cell is updated at time intervals three times as long as the time interval T.

Now, according to the aforementioned method in which the primary cell selection and the transmission power control are performed independently, there lies a problem that an optical primary cell selection cannot always be guaranteed.

More specifically, although the base station transmitting the DPDCH signals with better quality has to be selected, according to the conventional method, the criteria applied for the transmission power control which effects the communication quality is different from the criteria for the primary cell selection. As a result, there may be cases that a base station which provides better communication quality be not selected as primary cell.

Also, because the period of updating the primary cell is longer than the period of updating the transmission power control, there may be cases that updating the primary cell cannot follow the change of transmission power. As a result, a base station providing larger transmission power may not be selected as primary cell.

Further, because the primary cell update period is long, there may also be cases that updating the primary cell cannot follow fading fluctuations. This may also impede to receive the DPDCH signal transmitted from a base station providing larger transmission power.

Also, conventionally, as having been illustrated in FIG. 7, both the primary cell and the non-primary cells perform identical transmission power control based on the common TPC command,. which may possibly make it difficult to switch over from the primary cell to a non-primary cell. This may reduce effect of high-speed cell selection obtained by a raid switchover of primary cell to more optimal base station.

Moreover, because generally lower communication quality is provided by a non-primary cell than by the primary cell, the transmission error rate for a TPC command may possibly be increased on the uplink also. In such a case, there arises a problem that the base station may perform transmission power control based on an incorrect TPC command. As a result, greater transmission power difference than transmission loss difference may be produced between a plurality of base stations which are soft handover candidates. This may produced increases interference among the downlinks.

To cope with this problem, a method has been proposed in the Technical Report of IEICE, RCS 2000-164, published by the IEICE (the Institute of Electronics, Information and Communication Engineers). According to the preferred method, which has been referred to as SIDTPC (site independent diversity transmit power control), a mobile station measures the SIR of the signal from each base station after the RAKE receiver, and generates the TPC command to that each base station can perform independent transmission power control.

However, according to this method having been proposed, it becomes necessary to provide a large amount of bits in a TPC command to be transmitted in the uplink DPCCH, which becomes as many as the number of base stations, as compared with the conventional method. Or, in order to make the number of the TPC command bits identical to the conventional method, the transmission power control period becomes longer, which may deteriorate capability to follow fading fluctuations.

DISCLOSURE OF THE INVENTION

Considering the above-mentioned background, it is a first object of the present invention to enable selection of a base station which transmits a user data signal with better quality, in a communication condition such that the user data signal is transmitted with power control from one bases station selected from among a plurality of base stations by a mobile station.

It is a second object of the present invention to enable updating (switching) from the selected base station at high speed.

In order to attain the above-mentioned first object, according to a first aspect of the present invention, a mobile station has radio channels being set between the mobile station and a plurality of base stations, and performs communication with the plurality of base stations, in a communication condition such that one base station selected among the plurality of base stations transmits a user data signal which transmission power is controlled, and that the plurality of base stations including the selected base station transmit signals including a control data signal which transmission power is controlled in a similar way as the user data signal. The mobile station includes: a measurement section measuring, on a basis of each base station, quality of the control data signal transmitted with the transmission power controlled; a selector selecting the base station transmitting the user data signal, based on the quality of the control data signal from each base station measured in the measurement section; and a transmitter transmitting identification information for identifying the base station selected by the selector, to the plurality of base stations.

In regard to the above-mentioned quality measurement, signal-to-interference power ratio is used in one embodiment of the present invention, or reception power is used in another embodiment.

According to the first aspect of the present invention, the transmission of the user data signal from the base station with transmission power controlled is performed based on the quality of the control data transmitted with the transmission power controlled in a similar way as the user data signal. Therefore, as for the transmission of the user data signal, it becomes possible to select the base station which can transmit user data signal with the best quality, and accordingly, the mobile station can receive this user data signal with the best quality.

Preferably, the mobile station further includes a generator which has preset target quality and compares the target quality with the quality of the base station selected by the selector among the quality sets measured by the measurement section, generating power control information constructing to decrease the transmission power in case of th latter having better quality than the former, and instructing to increase the transmission power in case of transmitting the user data signal and the generation of the power control information are performed based on the quality of the identical control data signal. Namely, the criterion for the base station selection and the criterion for the power control information determination are commonized (unified).

Preferably, the mobile station further includes a generator generating power control information indicating how the transmission power of the plurality of base stations is to be controlled, based on the quality of the base station selected by the selector among the quality set measured by the measurement section. The transmitter stores the power control information generated by the generator, as well as the identification information, into each time slot in a frame having a plurality of time slots, and transmits the power control information and the identification information to the plurality of base stations.

In this way, the identification information of the base station transmitting the user data signal is transmitted in each time slot. Therefore, by use of each time slot data, it becomes possible to select the base station transmitting the user data signal. Thus, it becomes possible to select the base station (updating, or substitution, of the base station) more rapidly than in the conventional method, and the aforementioned second object of the present invention can be achieved. As a result, it becomes possible to make the base station selection follow fading variations.

According to a second aspect of the present invention, a base station has radio channels being set between the base station and a mobile station, and transmits a user data signal which transmission power is controlled to the mobile station only when the base station of interest is selected by the mobile station, and also transmits, to the mobile station, signals including a control data signal which transmission power is controlled in a similar way as the user data signal, irrespective of whether or not the mobile station of interest is selected. The base station includes: a receiver receiving identification information transmitted from the mobile station, representing the base station which is selected by the mobile station based on the quality of the control data signal transmitted with the transmission power controlled; and a transmitter transmitting the user data signal to the mobile station only when the identification information represents the base station of interest.

According to the second aspect of the present invention, a communication method for a base station is disclosed. The communication method is performed in each plurality of base stations, in a communication condition such that radio channels are set between the plurality of base stations and a mobile station, that a user data signal is transmitted which transmission power is controlled to the mobile station from one base station selected among the plurality of base stations, and that control data signals, which transmission power is controlled in a similar way as the user data signal, are transmitted to the mobile station from the plurality of base stations including the selected base station. The communication method includes: receiving identification information, transmitted from the mobile station, representing the base station which is selected by the mobile station based on the quality of the control data signal with the transmission power controlled; and when the identification information represents the base station of interest, transmitting the user data signal with the transmission power controlled, and also transmitting the control data signal with the transmission power controlled, whereas when the identification information does not represent the base station of interest, transmitting the control data signal with the transmission power controlled, without transmitting the user data.

According to a second aspect of the present invention, the base station transmitting the user data signal is selected by the mobile station, based on the control data signal with the transmission power controlled similar to that performed against the user data signal. Thus, it becomes possible to select the base station capable of transmitting the user data signal with the best quality, and the mobile station can receive the user data with the best quality.

Preferably, each of the base stations further receives in the receiver the power control information determined by the mobile station based on the quality of the control data signal, indicating how the transmission power is to be controlled. The base station further includes a power controller which controls transmission power of both the user data signal and the control data signal, based on the power control information received by the receiver.

In this way, similarly to the first aspect, both the selection of the base station transmitting the user data signal and the generation of the power control information for the power control of the base station are performed based on the same control data signal quality, and thus the criterions are commonized (unified).

Further, preferably, the identification information op the base station transmitting the user data signal is received in each time slot of a frame having a plurality of timing sets. Thus, it becomes possible to select the base station transmitting the user data signal in each time slot. This enables faster base station selection (update of the base station) than in the conventional method. As a result, updating the base station becomes easier to follow fading fluctuations than in the conventional method.

In the second aspect of the present invention, according to a first preferred embodiment, when the identification information represents the base station of interest, the power controller controls to increase the power in case of the power control information instructing increase of power, and to decrease the power in case of the power control information instructing decrease of power, whereas when the identification information does not represent the base station of interest, the power controller controls to increase the power in case of the power control information instructing increase of power, and maintains the present power in case of the power control information instructing decrease of power.

According to a second preferred embodiment, when the identification information represents the base station of interest, the power controller controls to increase the power in case of the power control information instructing increase of power, and to decrease the power in case of the power control information instructing decrease of power, whereas when the identification information does not represents the base station of interest, in case of the power control information instructing increase of power, the power controller controls to increase the power with a smaller increment than the increment of when the identification information represents the base station of interest, and in case of the power control information instructing decrease of power, the power controller controls to decrease the power with a smaller decrement than the decrement of when the identification information represents the base station of interest.

According to a third preferred embodiment, when the identification information represents the base station of interest, the power controller controls to increase the power in case of the power control information instructing increase of power, and to decrease the power in case of the power control information instructing decrease of power, whereas when the identification information does not represent the base station of interest, the power controller controls to maintain the present power in case of the power control information instructing either increase or decrease of power.

As such, according to these preferred embodiments, it is set to perform different power control between in the base station selected by the mobile station and in the base station not selected. Therefore, it becomes unnecessary for the mobile station to generate and transmit individual power control information for each base station. This enables reduction of power control information field in each time slot.

Also, with regard to the transmission power control method based on the power control information, the method employed for the base station selected by the mobile station differs from the method for other base stations not selected. Accordingly, the transmission power control results in higher probability of any base station not selected becoming substituted for the base station having been selected. In other words, updating the base station selection is promoted. Moreover, even when incorrect power control information is transmitted due to an uplink transmission failure, the transmission power difference between the base station selected and the base stations not selected can be prevented from extending more than the degree of transmission loss differences. As a result, increases of the interference on the downlink can be avoided.

According to a third aspect, in a mobile communication system having a plurality of base stations and a mobile station, with radio channels being set between the plurality of base stations and the mobile stations, in which a user data signal is transmitted with transmission power controlled to the mobile station from one base station selected among the plurality of base stations, and control data signals, which transmission power is controlled in a similar way as the user data signal. Such are transmitted to the mobile station from the plurality of base stations including the selected base station, the mobile station includes: a measurement section measuring quality of each control data signal on a basis of each base section; a selector selecting the base station transmitting the user data signal, based on the quality of the control data signal from each base station measured in the measurement section; and a transmitter transmitting identification information for identifying the base station selected by the selector to the plurality of transmitter transmitting the user data signal to the mobile station only when the identification information transmitted from the mobile station represents the base station of interest.

According to the third aspect, in a communication method for a base station among the plurality of base stations, with radio channels being set between the plurality of base stations and a mobile station, performed in a communication condition such that a user data signal which transmission power is controlled is transmitted to the mobile station from one base station selected among the plurality of base stations, and that control data signals, which transmission power is controlled in a similar way as the user data signal, are transmitted to the mobile station from the plurality of base stations including the selected base station, mobile station: measures quality of the control data signals on a basis of each base station; selects the base station transmitting the user data signal, based on the measured quality of each control data signal transmitted from each base station; and transmits identification information for identifying the selected base station, to the plurality of base stations, and each plurality of base stations: when the identification information transmitted from the mobile station represents the base station of interest, transmits the user data signal which transmission power is controlled based on the power control information to the mobile station, and also transmits the control data signal with the transmission power controlled, whereas when the identification information does not represent the base station of interest, transmits the control data signal with the transmission power controlled, without transmitting the user data.

According to this third aspect, it is possible to obtain the same functions and effects as in the first and second aspects of the present invention.

According to another aspect, a mobile station performing communication with a plurality of base stations includes: a measurement section measuring, on a basis of each base station, quality of control data signals which are transmitted from the plurality of base stations addressed to the mobile station of interest and which transmission power is controlled; a selector selecting a base station transmitting a user data signal addressed to the mobile station of interest, based on the quality of the control data signals which are addressed to the mobile station of interest and measured in the measurement section; and a transmitter transmitting identification information and for identifying the base station selected by the selector, to the plurality of base stations.

Further, according to still another aspect of the present invention, a base station performing communication with a mobile station includes: a receiver receiving identification information transmitted from the mobile station, representing the base station which is selected based on quality of control data signals which transmission power is controlled; and a transmitter when the identification information represents the base station of interest, transmitting with the transmission power controlled, both a user data signal addressed to the mobile station and the control data signal addressed to the mobile station, whereas when the identification information does not represent the base station of interest, transmitting the control data signal addressed to the mobile station with the transmission power controlled, without transmitting any user data addressed to the mobile station of interest.

Still further, according to another aspect of the present invention, in a mobile communication system performing communication between a plurality of base stations and a mobile station, the mobile station measures quality of control data signals, which are transmitted with the transmission power controlled from the plurality of base stations and addressed to the mobile station of interest, on a basis of each base station; selects the base station transmitting a user data signal addressed to the mobile station of interest, based on the measured quality of the control data signals which are transmitted from the plurality of base stations and addressed to the mobile station of interest; and transmits identification information for identifying the selected base station, to the plurality of base stations. The base station: when the identification information transmitted from the mobile station represents the base station of interest, transmits with the transmission power controlled, both the user data signal addressed to the mobile station and the control data signal addressed to the mobile station of interest, whereas when the identification information does not represent the base station of interest, transmits the control data signal addressed to the mobile station of interest with the transmission power controlled, without transmitting any user data addressed to the mobile station of interest.

Further scope and features of the present invention will become more apparent by the following description of the embodiments with the accompanied drawings.

THE PREFERRED EMBODIMENTS OF THE INVENTION

The preferred embodiment of the present invention is described hereinafter referring to the charts and drawings. However, it is noted that the following description merely exemplifies the embodiments of the invention, and accordingly the scope of the invention is not limited to the embodiments described below.

Figure 1:
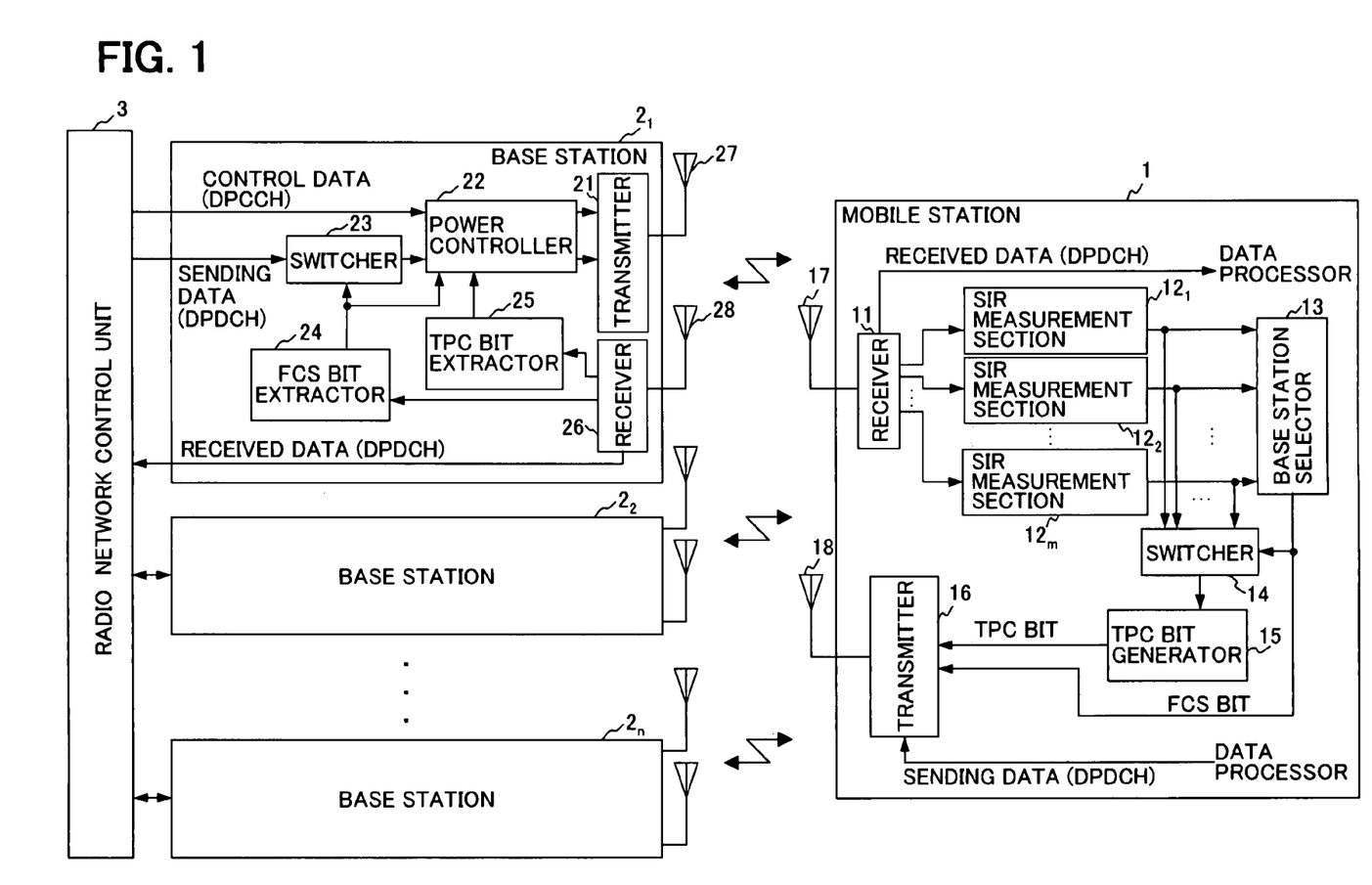
FIG. 1 shows a block diagram illustrating a portion of the mobile communication system according to an embodiment of the present invention.

FIG. 1 shows a block diagram illustrating a portion of the mobile communication system according to one embodiment of the present invention. This mobile communication system, as an example, employs W-CDMA (Wideband-Code Division Multiple Access), the communication standard of the third generation wireless communications (IMT-2000). The mobile communication system is provided with a mobile station 1, n base stations (where, n is an integer no less than 2), $2_1$–$2_n$, and a radio network control unit (base station control unit) 3.

Mobile station 1 is exemplified by portable telephone, automobile telephone, and personal digital assistance, which performs radio communication with the entire base stations $2_1$–$2_n$, or a portion thereof, using the Code Division Multiple Access (CDMA). This mobile station 1 is provided with a receiver 11, m SIR measurement sections $12_1$–$12_m$ (where, m is an integer no less than 2), a base station selector 13, a switcher (SW) 14, a TPC bit generator 15, a transmitter 16, and antennas 17, 18.

Antenna 17 receives downlink signals (data) transmitted form base stations $2_1$–$2_n$ (hereafter each base station $2_1$–$2_n$ is generically referred to as base station 2, except for the cases particularly necessary to distinguish) using 2 GHz-band radio waves. Antenna 17 then supplies the received data to receiver 11. Antenna 18 transmits uplink data supplied from transmitter 16 to base station 2 using the 2 GHz-band radio waves. Here, these antennas 17, 18 may otherwise be combined into a single antenna for both transmission and reception use.

The physical channels for the signals to be transmitted on the downward direction (downlink) include Dedicated Physical Channel (DPCH), Common Pilot Channel (CPICH), etc. The physical channels for the signals on the upward direction (uplink) include Dedicated Physical Channel (DPCH), Physical Random Access Channel (PRACH), etc.

Each channel includes frame (radio frames) each having a plurality of time slots, and communication data are conveyed in these time slots. Each frame has a length of, for example, 10 ms, in which 15 time slots are included.

Both the uplink DPCH and the downlink DPCH are individually assigned for each mobile station, and have Dedicated Physical Data Channel (DPDCH) and Dedicated Physical Control Channel (DPCCH).

One or more DPDCH are assigned for mobile station 1 which uses the DPCH, for use in conveying user data (voice data, character data, image data, etc.) of a user who uses mobile station 1. Meanwhile, one DPCCH is assigned for mobile station 1 which uses the DPCH, for use in conveying physical-layer control data in the DPCH. In the downlink, the DPDCH and the DPCCH are time-multiplexed within one time slot, whereas in the uplink, the DPDCH and the DPCCH are I/Q-multiplexed on a frame-by-frame basis.

At the time of the SSDT (site selection diversity transmit power control), the DPDCH is set only between mobile station 1 and base station 2 having been selected as primary cell (hereafter referred to as primary cell 2), whereas the DPDCH is not set between mobile station 1 and base station 2 determined as non-primary cell (hereafter referred to as non-primary cell 2).

Figures 2A, 2B:
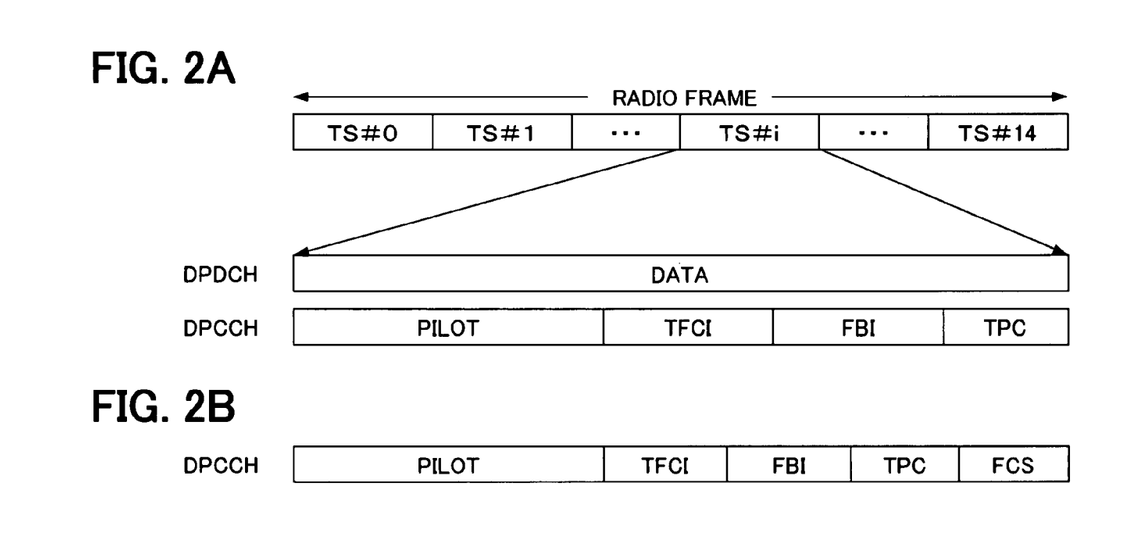
FIG. 2A shows a frame format of an uplink DPCH (DPDCH and DPCCH).
FIG. 2B shows another frame format of an uplink DPCCH.

FIG. 2A shows the frame structure of the uplink DPCH (DPDCH and DPCCH). As described earlier, each radio frame has a plurality of time slots (15 time slots, TS). Each time slot includes I/Q-multiplexed data of the DPDCH and the DPCCH.

The DPDCH includes user data, as described earlier. The DPDCH includes a pilot bit of a known pattern used for channel estimation in the pilot symbol aided coherent detection, a transport format combination indicator (TFCI), a transmit power control (TPC) bit (or TPC command) of base station 2, and feedback information (FBI).

One bit is assigned for the TPC bit. In this TPC bit, '1' is set when the transmission power of base station 2 is to be increased, while '0' is set when the transmission power of the base station 2 is to be decreased.

Further, according to the embodiment, fast cell selection (FCS) bits (or FCS command) are included kin the uplink DPCCH. These FCS bits may be included in the FBI field shown in FIG. 2A, or accommodated in an FCS field, as shown in FIG. 2B, when the FCS field is provided separately from the FBI field in the time slot (for example, as in the case of the extended 3 GPP specification, the 3rd Generation Partnership Projects.)

The FCS bits represent identification information indicating primary cell 2 selected at the time of the SSDT. As this identification information, for example, a temporary cell ID assigned for each base station 2 at the time of the SSDT is used. Namely, the base station having the temporary cell ID represented by the FCS bits is the primary cell, and other base stations are the non-primary cells.

Figure 3:
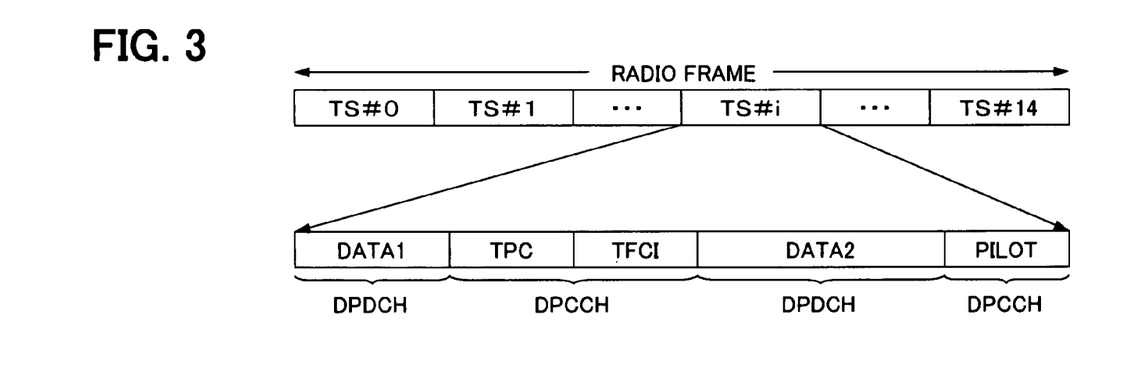
FIG. 3 shows a frame format of a downlink DPCH.

FIG. 3 shows the frame structure of the downlink DPCH. Similarly to the uplink DPCH, the downlink DPCH radio frame includes a plurality of time slots (15 time slots, TS).

In each time slot of the downlink DPCH, the DPDCH and the DPCCH are time-multiplexed, as described before. The DPCCH includes TPC bit, TFCI, and pilot bit for mobile station 1.

Now, receiver 11 performs amplification, de-spreading, RAKE combining, frequency conversion, A/D conversion, etc. against the signals received by antenna 17. Receiver 11 supplies the DPDCH data included in the reception signal to a data processor, and supplies the DPCCH data to SIR measurement sections $12_1$–$12_m$.

Data processor performs predetermined process against the DPDCH data, and thereafter outputs voice data included in the data to a speaker etc. (not shown), and displays character data, image data, etc. included in the data onto a display unit (not shown) such as a liquid crystal display.

The reception signal of the DPCCH is Rake-combined by receiver 11 on a basis of each base station 2, and thereafter demultiplexed into the DPCCH data of each base station 2. The demultiplexed DPCCH data of each base station 2 is supplied to each SIR measurement sections $12_1$–$12_m$. For example, the DPCCH of base station $2_1$ is supplied to SIR measurement section $12_1$, the DPCCH of base station $2_2$ is supplied to SIR measurement section 12, and so on.

The above value m is set equal to the number of base stations 2 to be selected as candidate for soft handover, i.e. the number of the active sets. Therefore, in ordinary cases, m is set smaller than n (m<n). Further, even on receipt of signals from more than m base stations 2, receiver 11 selects the radio waves received from m base stations 2. Thereafter receiver 11 performs RAKE combining against the signals received from each base station 2, and supplies the Rake-combined signals to SIR measurement sections $12_1$–$12_m$.

Here, the active sets are updated periodically, as mobile station 1 moves. Also, when one cell is divided into a plurality of sectors, each divided sector is assigned as active set.

SIR measurement sections $12_1$–$12_m$ (hereafter generically referred to as SIR measurement section 12, except for the cases when discrimination is required in particular) measure an SIR (signal-to-interference power ratio) of the received DPCCH data corresponding to each base station 2 on a time slot basis, and supplies the SIR measurement value for each time slot to base station selector 13 and switcher 14.

Base station selector 13 determines the maximum value of the SIR by comparing m SIR data supplied from SIR measurement section 12. Base station selector 13 then selects base station 2 corresponding to the maximum SIR value as primary cell. Thereafter, base station selector 13 supplies identification information, representing the selected primary cell (for example, temporary cell ID) as the FCS bits to switcher 14 and transmitter 16.

Here, the identification information assigned to each base station 2, for example the temporary ID, is notified in advance both to base station 2 and mobile station 1 from radio network control unit 3. In addition, when there are two or more base stations 2 producing the identical maximum SIR value, any arbitrary one of base stations 2 is selected as primary cell. Base stations 2 other than primary cell 2 become non-primary cells.

According to the FCS bits supplied by base station selector 13, switcher 14 sets the own switch condition so that the SIR of primary cell 2 indicated by the FCS bits is output to TPC bit generator 15. Thus, the maximum SIR value is supplied to TPC bit generator 15 via switcher 14.

In TPC bit generator 15, a target SIR determined by non-illustrated outer-loop transmission power control is set in advance. TPC bit generator 15 compares the maximum SIR value supplied from switcher 14 with the preset target SIR. When the maximum SIR value is greater than the target SIR, TPC bit generator 15 outputs to transmitter 16 the TPC bit '0' (DOWN bit), which is an instruction to decrease the transmission power. When the maximum SIR value is smaller than the target SIR, TPC bit generator 15 outputs to transmitter 16 of the TPC bit '1' (UP bit), which is an instruction to increase the transmission power. When the maximum SIR equals to the target SIR, whichever instruction of increasing or decreasing the transmission power is applicable. One of the instructions is set in advance in TPC bit generator 15.

The DPDCH data supplied from the data processor, as well as data related to other channels (not shown), is input to transmitter 16, in addition to the FCS bits supplied from base station selector 13 and the TPC bit supplied from TPC bit generator 15. The DPDCH data includes voice data input by the user from a microphone (not shown), image data input from an imaging device such as a CCD camera, and the like.

Transmitter 16 performs processing against these input data, such as frequency conversion, spreading, D/A conversion, orthogonal modulation, and amplification. Transmitter 16 then transmits the processed data to base station 2 via antenna 18.

The TPC bit and the FCS bits are transmitted on the DPCCH as shown in FIGS. 2A, 2B explained earlier.

The TPC bit consisting of one bit is included in each time slot in one frame (for example, each time slot in 15 time slots). Using this TPC bit transmitted in each time slot, base station 2 can perform transmission power control, as will be described later. For example, in case that one frame length (in terms of time) is 10 ms, and one frame includes 15 time slots (i.e. 1 time slot=0.067 ms), the transmission power control is performed at the rate of 1,500 times per second.

Also, as for the FCS bits, the entire bits are included in each time slot in one frame. Namely, in one time slot, the FCS bits necessary for identifying each of m base stations 2 of active sets are included. For example, when m=8, the FCS bits of at least 3 bits are included in one time slot. Thus, using the FCS bits included in one time slot, each base station 2 can determine whether the base station concerned in selected as primary cell. As a result, the primary cell is updated at the same intervals as the power control is performed using the TPC bit (for example 1,500 times per second). Thus, high-speed cell selection is achieved.

Now, each base station $2_1$–$2_n$ has the identical configuration, including transmitter 21, power controller 22, switcher (SW) 23, FCS bit extractor 24, TPC bit extractor 25, receiver 26, and antennas 27, 28.

Antenna 28 receives uplink signals (data) transmitted from mobile station 1, using the 2 GHz-band ratio waves, and supplies the received data to a receiver 26. Antenna 27 transmits downlink signals (data) supplied from transmitter 21 to mobile station 1, also using the 2 GHz-band radio wave. These antennas 27, 28 may otherwise be combined into a single antenna for both transmission and reception use.

Receiver 26 performs the same processing against the reception data as receiver 11 in mobile station 1 described earlier. Receiver 26 then supplies the received DPDCH data to radio network control unit 3, and also supplies the received DPCCH data to TPC bit extractor 25 and FCS bit extractor 24.

Radio network control unit 3 transmits the received DPCCH data to the base station 2 concerned, or another based station 2, or a non-illustrated core network. This reception data is finally transmitted to another mobile station, or a server, terminal, etc. in another communication network (for example, the Internet)

TPC bit extractor 25 extracts the TPC bit from each time slot of the DPCCH, and supplies the extracted TPC bit to power controller 22. FCS bit extractor 24 extracts the FCS bits from each time slot of the DPCCH, and supplies the extracted FCS bits to switcher 23 and power controller 22.

The transmission data of the DPDCH supplied from radio network control unit 3 is input to switcher 23, in addition to the FCS bits supplied from FCS bit extractor 24.

Switcher 23 determines whether the FCS bits supplied from FCS bit extractor 24 are identification information indicative of the base station concerned. Switcher 23 sets the own setting conditions depending on the above determination result, as described in the following: If the identification information represented by the FCS bits specify the base station concerned (in other words, if the base station concerned has been selected as primary cell), switcher 23 supplies the DPDCH transmission data to power controller 22. On the other hand, if the identification information represented by the FCS bits does not specify the base station concerned (in other words, if the base station concerned is a non-primary cell), switcher 23 does not supply the DPDCH transmission data to power controller 22. With these settings, the SSDT is performed, and the DPDCH transmission data is transmitted from the primary cell only, and not transmitted from any non-primary cells.

Because the FCS bits are supplied to switcher 23 at each time slot of the DPCCH, the above-mentioned determination whether the base station concerned is the primary cell, and the setting whether the DPDCH transmission data is to be supplied to power controller 22 are performed at the intervals of the time slots (for example, 0.667 ms or 1,500 times per second). In such a way, updating of the primary cell is performed at the time slot intervals.

When there are a plurality of mobile stations which are communicating with one base station 2, the DPDCH transmission data with regard to the plurality of mobile stations are input to switcher 23. At the same time, the FCS bits and the TPC bit in the DPCCH are transmitted from the plurality of mobile stations. In this case, switcher 23 sets whether or not the DPDCH transmission data for each mobile station is to be supplied to power controller 22, based on the FCS bits from each mobile station. For example, when a mobile station A selects base station $2_1$ as primary cell, whereas a mobile station B does not select base station $2_1$ as primary cell, switcher 23 in base station $2_1$ supplies the DPDCH transmission data for the mobile station A to power controller 22, whereas switcher 23 does not supply the DPDCH transmission data for the base station B to power controller 22.

The DPCCH transmission data is also input to power controller 22 of base stations 2 from radio network control unit 3, in addition to the TPC bit supplied from TPC bit extractor 25, the FCS bits supplied from FCS bit extractor 24, and the DPDCH transmission data supplied from switcher 23 when the base station concerned is selected as primary cell.

Based on the FCS bits and the TPC bit input, power controller 22 controls the transmission power of both the DPCCH transmission data and the DPDCH transmission data supplied from switcher 23, to increase or decrease the transmission power.

Figure 4A:
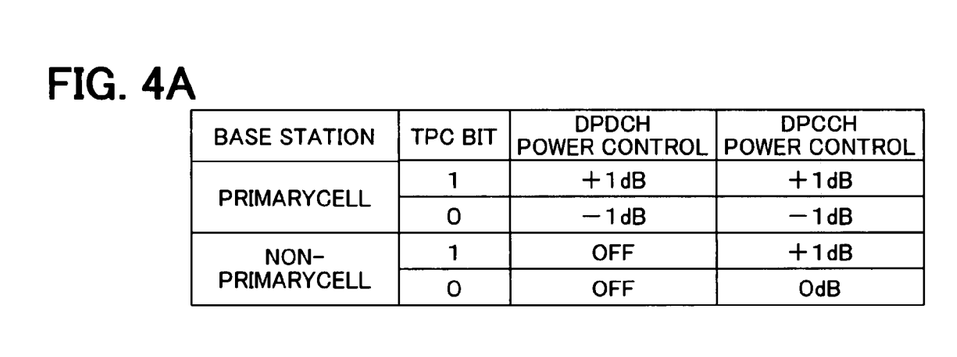
FIG. 4A shows a power control method according to an embodiment of the present invention.

FIG. 4A shows a power control method according to the embodiment of the present invention in a tabular form. Power controller 22 in base section 2 determines whether the base station concerned has been selected as primary cell, using the FCS bits. Also, power controller 22 determines whether the TDC bit is '1' (UP bit), or '0' (DOWN bit).

When the TC bit is '1', power controller 22 in primary cell 2 increases the transmission power of both the DPDCH and the DPCCH by 1 dB, whereas when the TPC bit is '0', power controller 22 decreases the transmission power of both the DPDCH and the DPCCH by 1 dB.

On the other hand, in non-primary cell 2, switcher 23 inhibits to input the DPDCH data to power controller 22. Accordingly, power controller 22 in base station 2 of non-primary cell does not perform the transmission power control for the DPDCH (power control is set off). Meanwhile, power controller 22 in non-primary cell 2 performs transmission power control for the DPCCH in the following manner. When the TPC bit is '1', power controller 22 increases the DPCCH transmission power by 1 dB. When the TPC bit is '0', power controller 22 neither increases nor decreases the DPCCH transmission power (that is, the increase/decrease amount is ±0 dB).

Additionally, as for the transmission power, an upper limit is set in advance in power controller 22. When the power value is to exceed the upper limit, power controller 22 does not increase the power, despite the TPC bit '1'.

The transmission data of the DPCCH and the DPDCH, to which the above-mentioned power control has been performed, are supplied to transmitter 21.

To transmitter 21, in addition to the DPCCH data (and the DPDCH data), data related to other channels (not shown) are supplied. Transmitter 21 performs the same processing as for mobile station 1 described earlier against these channel data, and transmits these channel data via antenna 27.

As such, inner-loop power control is performed in a closed loop formed of receiver 11, SIR measurement section 12, switcher 14, TPC bit generator 15, and transmitter 16 in mobile station 1, and also in a closed loop formed of receiver 26, TPC bit extractor 25, power controller 22 and transmitter 21 in the base station 2.

According to the embodiment of the present invention, transmission power control is performed in a different manner between in the primary cell and in the non-primary cell, against the common TPC bit. Accordingly, it is not necessary to generate and transmit different TPC bits to respective base stations, and thus the TPC bit field can be reduced in size.

Further, in non-primarily cell 2, the transmission power is not decreased when the TPC bit is '0', whereas the transmission power is increased when the TPC bit is '1'. This increases the probability of the SIR of non-primary cell 2 becoming greater than the SIR of primary cell 2. Accordingly, the probability of non-primarily cell 2 being selected as primary cell 2 becomes greater. In other words, easier substitution of primary cell 2 is promoted. As a result, mobile station 1 can receive a DPDCH data transmitted from base station 2 with better communication quality.

Further, even when an incorrect TPC bit is transmitted due to a transmission failure in the uplink, the transmission power difference between the primary cell and the non-primary cell can be prevented from extending more than the degree of transmission loss difference. As a result, increase of the interference on the downlink can be avoided. For example, even when an incorrect TPC bit of '0' is transmitted to the non-primary cell due to a transmission failure, despite the correct value '1', the transmission power of the non-primary cell is not decreased. Accordingly, it becomes possible to avoid an excessively large amount of variation in the transmission power difference produced between the primary cell and the non-primary cell.

Moreover, according to the embodiment of the present invention, the selection of primary cell is performed based on the SIR, which is one of reception characteristics of the DPCCH on which the power control is performed. A base station 2 having the maximum SIR value is selected as primary cell. There is a correlation between whether the SIR of the DPCCH is large (that is, whether the communication quality is good) and whether the SIR of the DPDCH, in which the similar power control is performed, is large. Therefore, primary cell 2 having been selected based on the SIR of the DPCCH is to provide good communication quality of the DPDCH. Thus, on the occurrence of the SSDT, it becomes possible for mobile station 1 to receive the DPDCH from the base station which provides good communication quality.

Further, according to the embodiment, selection of the primary cell 2 is performed at the time slot intervals. Accordingly, updating the primary cell 2 is performed more rapidly than that performed in the conventional method. It becomes possible to follow fading variations at higher speed than before. Even when the fading varies abruptly, updating the primary cell at high speed makes it possible to avoid a bad influence to the communication quality.

Figure 4B:
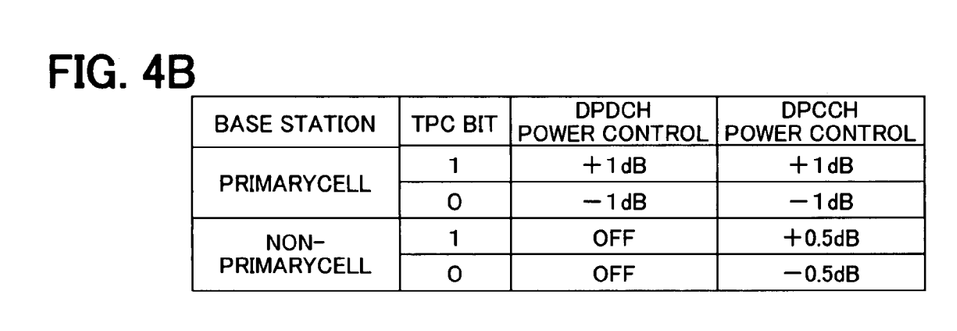
FIG. 4B shows another power control method illustrated in a tabular form.

FIG. 4B shows another power control method illustrated in a tabular form. The transmission power control in base station 2 acting as non-primary cell is different from the power control method shown in FIG. 4A, though the transmission power control in base station 2 selected as primary cell is identical. Namely, the DPCCH transmission power in non-primary cell 2 is increased by 0.5 dB when the TPC bit is '1'; and is decreased by 0.5 dB when the TPC bit is '0'.

In this method, the power is decreased to a greater extent in the primary cell than in the non-primary cell, in case of decreasing the transmission power. This can also promote easier substitution of the primary cell. Moreover, even when an incorrect TPC bit is transmitted due to an uplink transmission failure, the transmission power difference between the primary cell and the non-primary cell can be prevented from extending more than the degree of transmission loss difference. As a result, an interference increase on the downlink can be avoided.

Figure 4C:
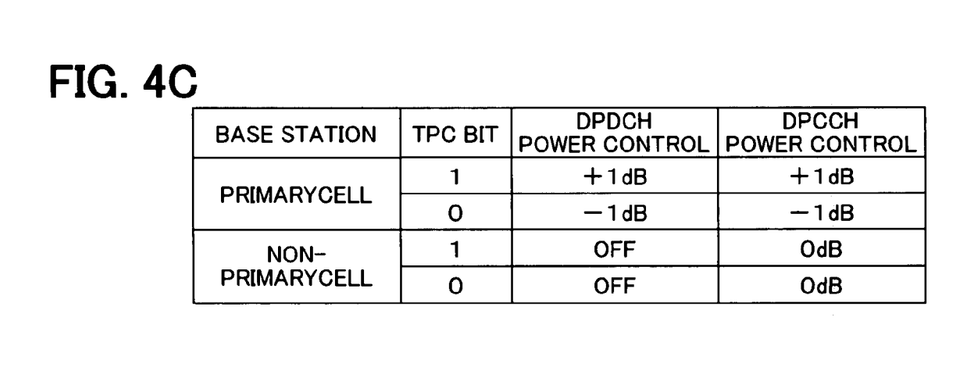
FIG. 4C shows still another power control method illustrated in a tabular form.

FIG. 4C shows still another power control method illustrated in a tabular form. According to this method, when base station 2 is a non-primary cell, the DPCCH transmission power is controlled to be invariable, irrespective of the TPC bit of '1' or '0'.

With this method also, the power is decreased to a greater extent in the primary cell than in the non-primary cell, in case of decreasing the transmission power. This can also promote easier substitution of the primary cell. Moreover, even when an incorrect TPC bit is transmitted due to an uplink transmission failure, the transmission power difference between the primary cell and the non-primary cell can be prevented from extending more than the degree of transmission loss difference. As a result, an interference increase on the downlink can be avoided.

Figure 5:
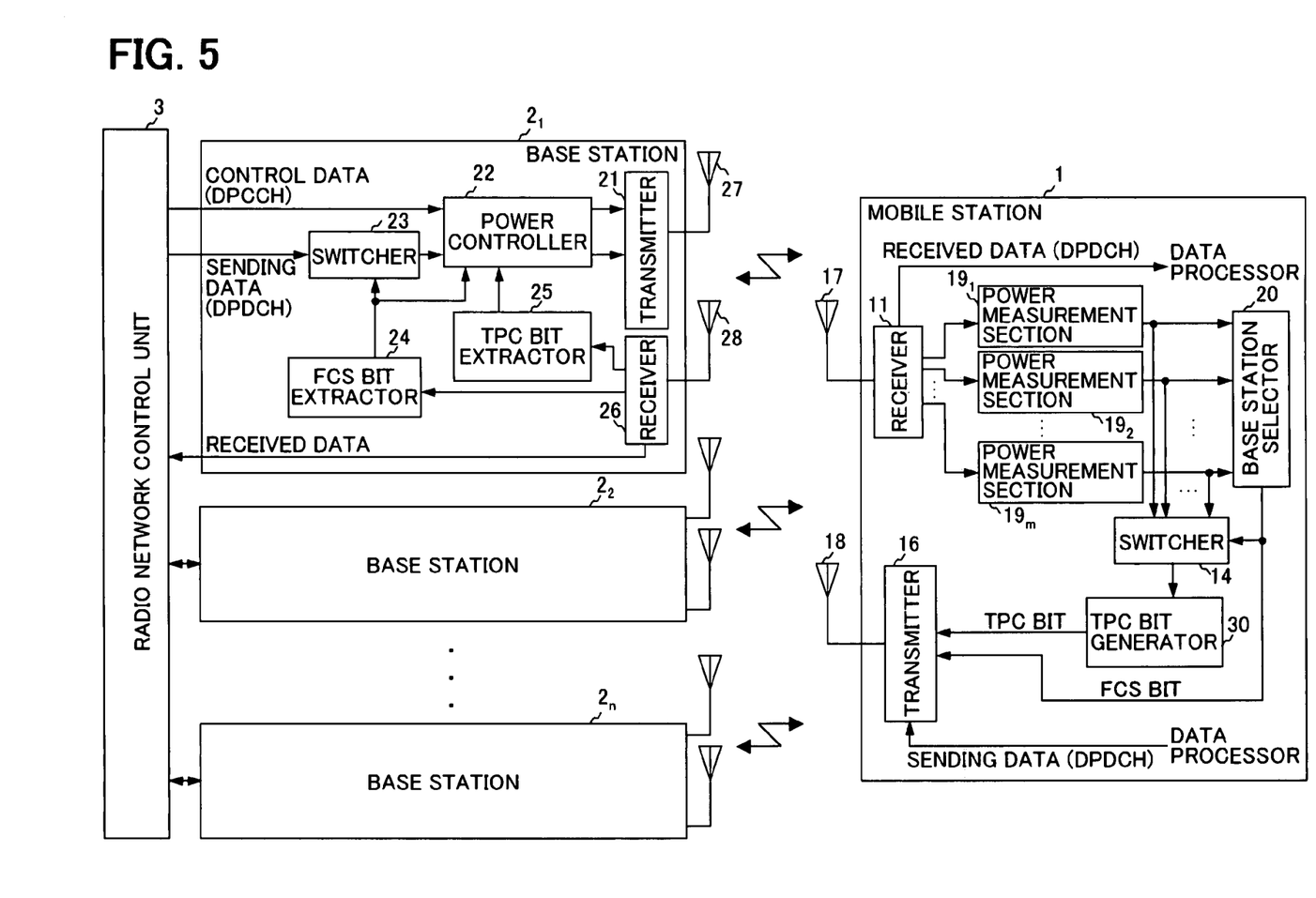
FIG. 5 shows a block diagram illustrating a portion of a mobile communication system according to another embodiment of the present invention.

As another embodiment of the present invention, mobile station 1 selects a primary cell by comparing the DPCCH power, other than the SIR of the DPCCH. FIG. 5 shows a block diagram illustrating a portion of the mobile communication system according to this alternative embodiment of the present invention.

In the mobile communication system shown in FIG. 5, identical symbols are assigned to configuration elements identical to those shown in FIG. 1, and detailed description of these configuration elements is omitted. In the mobile communication system shown in FIG. 5, differently from that shown in FIG. 1, the SIR measurement sections $12_1$–$12_m$ in mobile station 1 in FIG. 1 is replaced by power measurement sections $19_1$–$19_m$ in FIG. 5, so as to measure the DPCCH reception power (RSCP: received signal code power) received in receiver 11.

With this configuration, a base station selector 20 determines the maximum power value among m power values measured in power measurement sections $19_1$–$19_m$, and outputs as the FCS bits the identification information of base station 2 corresponding to the maximum power value. Also, a TPC bit generator 30 compares the target power value having been set in advance by a non-illustrated outer-loop transmission power control, with the maximum power value selected by switcher 14. A TPC bit '0' is output when the maximum power value is greater than the target power value, whereas a TPC bit '1' is output when the maximum power value is smaller than the target power value. Other configuration elements in both mobile station 1 and base station 2 are similar to those shown in FIG. 1.

With this alternative embodiment, high-speed selection of a primary cell having good communication quality can be attained, in a similar way to the mobile communication system shown in FIG. 1.

Additionally, in the description of the embodiments having been illustrated, the reception characteristic of the DPCCH is measured. However, it may also be possible to measure the reception characteristics (the SIR, the reception power RSCP, etc.) of other channels on which the transmission power control is performed in a similar way to the DPDCH.

Further, in the foregoing description of the embodiment, W-CDMA is applied as prerequisite. However, the present invention is not limited to the W-CDMA system. The present invention may also be applicable for the Code Division Multiple Access (CDMA) systems as a whole, including the multi-carrier CDMA. Also, it is possible to apply the present invention to other communication systems, such as the Orthogonal Frequency Division Multiplex (OFDM) employed as transmission technique for ground-wave digital broadcasting.

INDUSTRIAL APPLICABILITY

The present invention can be applied for a mobile communication system, as well as a mobile station (portable telephone, car telephone, PDA, etc.) and a base station in the mobile communication system. For example, the present invention is for use in a mobile communication system in which communication is performed by the multi-carrier CDMA system including W-CDMA, and a mobile station and a base station in the mobile communication system concerned.

According to the present invention, selection of the base station transmitting a user data signal with power control is performed based on the quality of the control data signal transmitted with power control similar to that performed against the user data signal. Therefore, as for the user data signal, it is possible to select the base station which can transmit the user data signal with the best quality, and the mobile station can receive the user data of good quality.

Also, according to the present invention, in a communication condition in which user data signal is transmitted from one base station selected by the mobile station among a plurality of base stations, updating (switching) from the selected base station can be performed at high speed.

Further, according to the present invention, a criterion for selecting the base station transmitting the user data signal and a detection criterion of the transmission power control information are commonized, and a base station having better communication quality can be selected.

The foregoing description of the embodiments is not intended to limit the invention to the particular details of the example illustrated. Any suitable modification and equivalents may be resorted to the scope of the invention. All features and advantages of the invention which fall within the scope of the invention are covered by the appended claims.

What is claimed is:

1. A base station having radio channels being set between the base station and a mobile station, transmitting a user data signal which transmission power is controlled to the mobile station only when the base station of interest is selected by the mobile station, and transmitting to the mobile station, signals including a control data signal which transmission power is controlled in a similar way as the user data signal, irrespective of whether or not the mobile station of interest is selected, said base station comprising:
   a receiver receiving identification information transmitted from the mobile station, representing the base station which is selected by the mobile station based on the quality of the control data signal transmitted with the transmission power controlled; and
   a transmitter transmitting the user data signal to the mobile station only when the identification information represents the base station of interest.

2. The base station according to claim 1,
   wherein the receiver further receives power control information determined by the mobile station based on the quality of the control data signal, indicating how the transmission power is to be controlled, and
   said base station further comprises a power controller which controls transmission power of both the user data signal and the control data signal, based on the power control information received by the receiver.

3. The base station according to claim 2,
   wherein, when the identification information represents the base station of interest, the power controller controls to increase the power in case of the power control information instructing increase of power, and to decrease the power in case of the power control information instructing decrease of power, whereas when the identification information does not represent the base station of interest, the power controller controls to increase the power in case of the power control information instructing increase of power, and maintains the present power in case of the power control information instructing decrease of power.

4. The base station according to claim 3, wherein a power increment when the identification information represents the base station of interest equals to a power increment when the identification information does not represent the base station of interest.

5. The base station according to claim 2,
   wherein, when the identification information represents the base station of interest, the power controller controls to increase the power in case of the power control information instructing increase of power, and to decrease the power in case of the power control information instructing decrease of power, whereas when the identification information does not represent the base station of interest, in case of the power control information instructing increase of power, the power controller controls to increase the power with a smaller increment than the increment of when the identification information represents the base station of interest, and in case of the power control information instructing decrease of power, the power controller controls to decrease the power with a smaller decrement than the decrement of when the identification information represents the base station of interest.

6. The base station according to claim 2,
   wherein, when the identification information represents the base station of interest, the power controller controls to increase the power in case of the power control information instructing increase of power, and to decrease the power in case of the power control information instructing decrease of power, whereas when the identification information does not represent the base station of interest, the power controller controls to maintain the present power in case of the power control information instructing either increase or decrease of power.

7. A mobile communication system having a plurality of base stations and a mobile station, with radio channels being set between the plurality of base stations and the mobile station, in which a user data signal is transmitted with transmission power controlled to the mobile station from one base station selected among the plurality of base stations, and control data signals, which transmission power is controlled in a similar way as the user data signal, are transmitted to the mobile station from the plurality of base stations including the selected base station,
   wherein said mobile station comprises:
   a measurement section measuring quality of the control data signal on a basis of each base station;
   a selector selecting the base station transmitting the user data signal, based on the quality of the control data signal from each base station measured in the measurement section; and
   a transmitter transmitting identification information for identifying the base station selected by the selector to the plurality of base stations,
   and each plurality of base stations comprises:
   a transmitter transmitting the user data signal to the mobile station only when the identification information transmitted from the mobile station represents the base station of interest.

8. A communication method for a base station among a plurality of base stations, with radio channels being set between the plurality of base stations and a mobile station, performed in a communication condition such that a user data signal which transmission power is controlled is transmitted to the mobile station from one base station selected among the plurality of base stations, and that control data signals, which transmission power is controlled in a similar way as the user data signal, are transmitted to the mobile station from the plurality of base station including the selected base station, said communication method comprising:
   receiving identification information, transmitted from the mobile station, representing the base station which is selected by the mobile station based on the quality of each control data signal when the transmission power controlled; and
   when the identification information represents the base station of interest, transmitting the user data signal with the transmission power controlled, and also transmitting the control data signal with the transmission power controlled, whereas when the identification information does not represent the base station of interest, transmitting the control data signal with the transmission power controlled, without transmitting the user data.

9. A communication method for a base station among a plurality of base stations, with radio channels being set between the plurality of base stations and a mobile station, performed in a communication condition such that a user data signal which transmission power is controlled is transmitted to the mobile station from one base station selected among the plurality of base stations, and that control data signals, which transmission power is controlled in a similar way as the user data signal, are transmitted to the mobile station from the plurality of base stations including the selected base station, wherein said mobile station:

measures quality of the control data signals on a basis of each base station;

selects the base station transmitting the user data signal, based on the measured quality of each control data signal transmitted from each base station; and transmits identification information for identifying the selected base station, to the plurality of base stations, and wherein said each plurality of base stations:

when the identification information transmitted from the mobile station represents the base station of interest, transmits the user data signal which transmission power is controlled based on the power control information to the mobile station, and also transmits the control data signal with the transmission power controlled, whereas when the identification information does not represent the base station of interest, transmits the control data signal with the transmission power controlled, without transmitting the user data.

10. A base station performing communication with a mobile station, comprising:

a receiver receiving identification information transmitted from the mobile station, representing the base station which is selected based on quality of control data signals which transmission power is controlled; and a transmitter when the identification information represents the base station of interest, transmitting with the transmission power controlled, both a user data signal addressed to the mobile station and the control data signal addressed to the mobile station, whereas when the identification information does not represent the base station of interest, transmitting the control data signal addressed to the mobile station with the transmission power controlled, without transmitting any user data addressed to the mobile station of interest.

11. A mobile communication system performing communication between a plurality of base stations and a mobile station, wherein said mobile station:

measures quality of control data signals, which are transmitted with the transmission power controlled from the plurality of base stations and addressed to the mobile station of interest, on a basis of each base station;

selects the base station transmitting a user data signal addressed to the mobile station of interest, based on the measured quality of the control data signals which are transmitted from the plurality of base stations and addressed to the mobile station of interest; and transmits identification information for identifying the selected base station, to the plurality of base stations, and wherein said base station:

when the identification information transmitted from the mobile station represents the base station of interest, transmits with the transmission power controlled, both the user data signal addressed to the mobile station and the control data signal addressed to the mobile station of interest, whereas when the identification information does not represent the base station of interest, transmits the control data signal addressed to the mobile station of interest with the transmission power controlled, without transmitting any user data addressed to the mobile station of interest.

* * * * *